(No Model.)

C. L. SPONENBURGH.
CHECK REIN SPRING.

No. 353,602. Patented Nov. 30, 1886.

Attest:
John Schuman.

Inventor:
Charles L. Sponenburgh,
by his Att'y

UNITED STATES PATENT OFFICE.

CHARLES L. SPONENBURGH, OF DETROIT, MICHIGAN.

CHECK-REIN SPRING.

SPECIFICATION forming part of Letters Patent No. 353,602, dated November 30, 1886.

Application filed April 22, 1886. Serial No. 199,778. (No model.)

*To all whom it may concern:*

Be it known that I, CHARLES L. SPONENBURGH, of Detroit, in the county of Wayne and State of Michigan, have invented new and useful Improvements in Check-Springs; and I hereby declare that the following is a full, clear, and exact description thereof, reference being had to the accompanying drawings, which form a part of this specification.

This invention relates to certain new and useful improvements in the construction of check-rein springs of that class in which greater freedom is given to the horse's head than can be had in the employment of the ordinary rigid check-rein.

The invention consists in the peculiar construction of the various parts, their combination and operation, as more fully hereinafter described and claimed.

Figure 1:
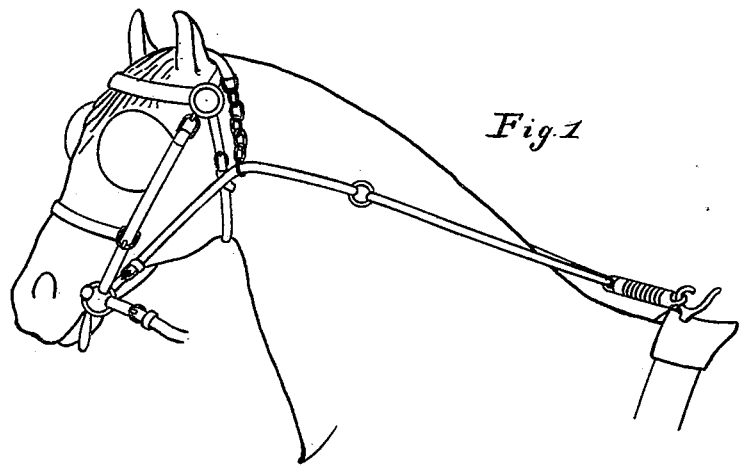
Figure 2:
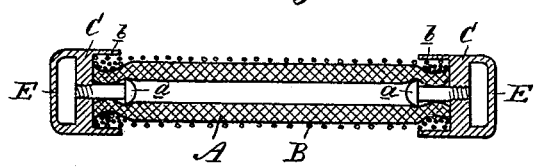

Figure 1 is a representation of my improved device as in operation, one end being attached to the check-rein and the other to the check-rein terret of the harness. Fig. 2 is a central longitudinal section through the device, which is shown detached.

In the drawings, A is a piece of pure rubber piping, or it may be a solid piece of round rubber.

a are screws, the heads of which are embedded in the axis of the rubber, and secured therein by winding wire around the rubber between the end thereof and the position of the screw-head, thereby compressing the rubber at that point, so that the screw-heads cannot be pulled out by any normal strain brought upon the screws when the device is in operation. The ends of the screws project beyond the ends of the rubber, as shown in Fig. 2.

B is a coil-spring inclosing the rubber and extending its whole length.

C are metallic caps or heads, so made as to engage with the screws, as shown, and the overlapping flanges b of these heads are brazed, soldered, or otherwise secured to the ends of the coil-springs. These heads or caps are provided with loops E, that upon one of the caps being designed to connect with the check-rein, and that upon the other to connect with the check-rein terret.

I am aware of the Patents Nos. 209,941 and 331,892, and make no claim to the constructions shown therein as forming part of my invention.

What I claim as my invention is—

The improved check-rein spring described, consisting of the rubber tube A, coil-spring B, surrounding the same, screws a, the heads of which are embedded in the axis of said rubber spring, binding-wires for compressing said spring and securing said screws therein, the metallic cap C, comprising in a single piece the flanges b and loop E, and secured to the ends of the coil-springs, with said flanges embracing and protecting said binding-wires, substantially as shown and described.

CHAS. L. SPONENBURGH.

Witnesses:
  H. S. SPRAGUE,
  CHARLES J. HUNT.